July 17, 1928.

E. T. FERNGREN 1,677,436

GLASS FEEDING AND DELIVERING MECHANISM AND PROCESS

Original Filed Sept. 29, 1913   7 Sheets-Sheet 1

Witnesses
Frank R Glore
H. C. Rodgers

Inventor
E. T. Ferngren
By George F. Hoope Atty.

July 17, 1928.

E. T. FERNGREN 1,677,436

GLASS FEEDING AND DELIVERING MECHANISM AND PROCESS

Original Filed Sept. 29, 1913    7 Sheets-Sheet 2

Fig. 2.

Witnesses
Frank R. Gove
H. C. Rodgers

Inventor
E. T. Ferngren
By George M. Hopps Atty.

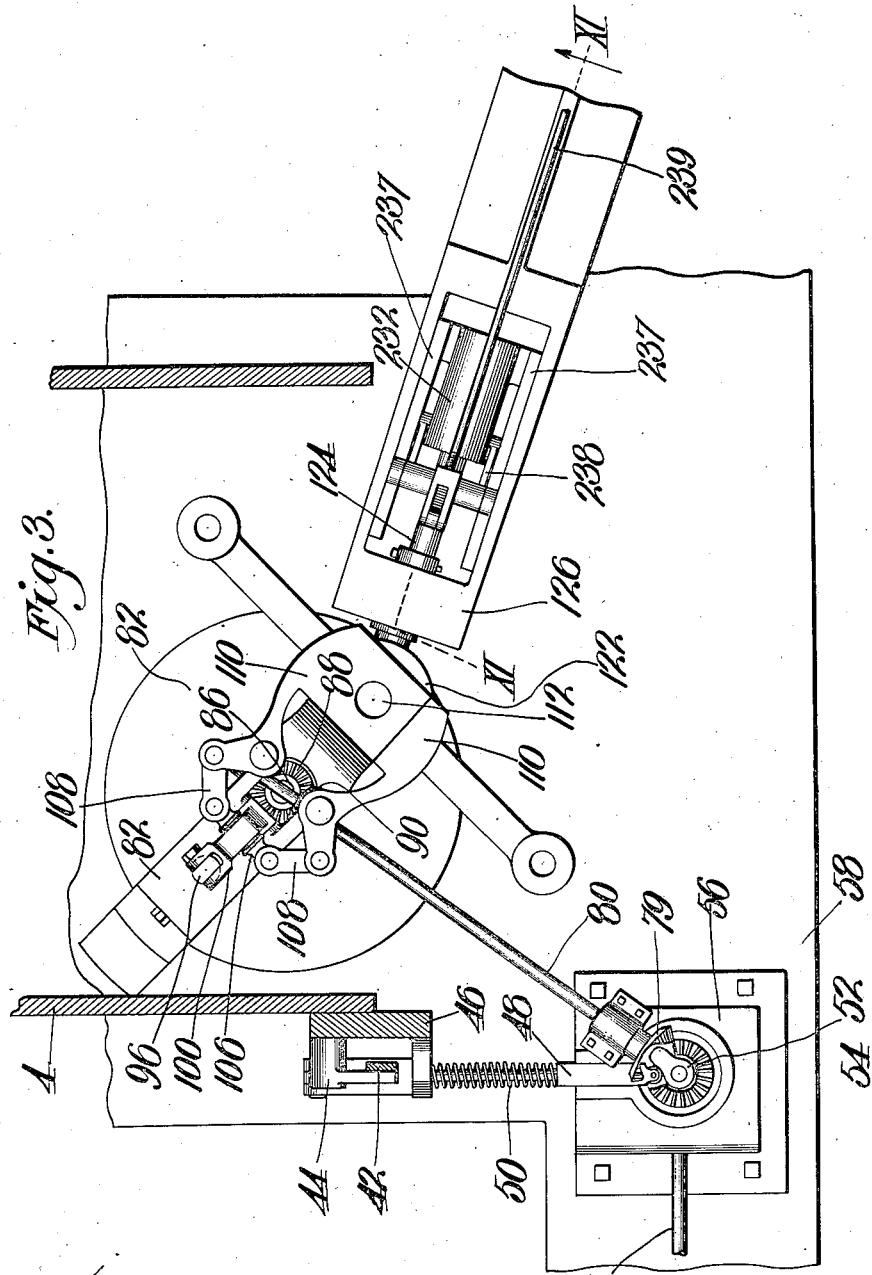

July 17, 1928.  1,677,436
E. T. FERNGREN
GLASS FEEDING AND DELIVERING MECHANISM AND PROCESS
Original Filed Sept. 29, 1913    7 Sheets-Sheet 4
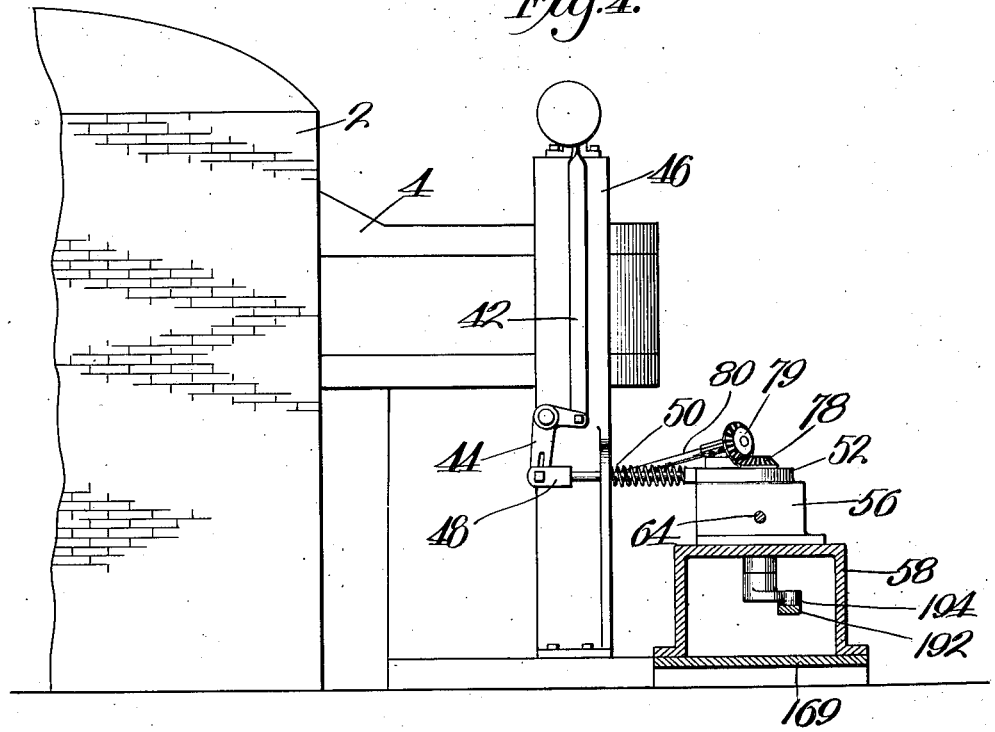
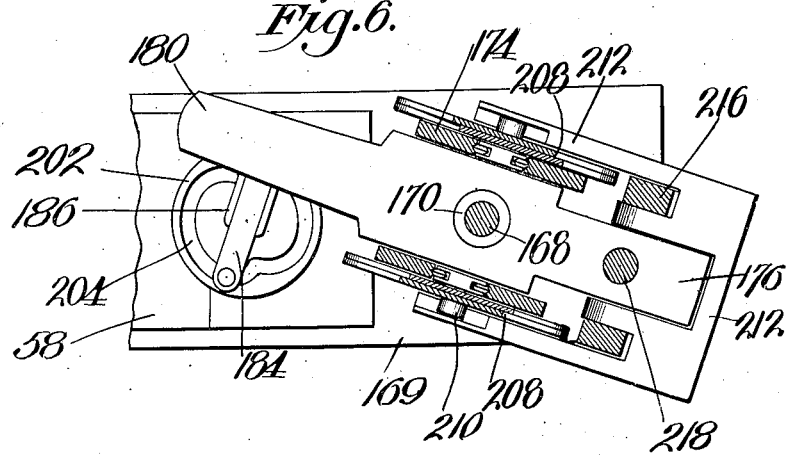
Witnesses
Frank R. Glim
H. C. Rodgers
Inventor
E. T. Ferngren
By George H. Thorpe Atty.

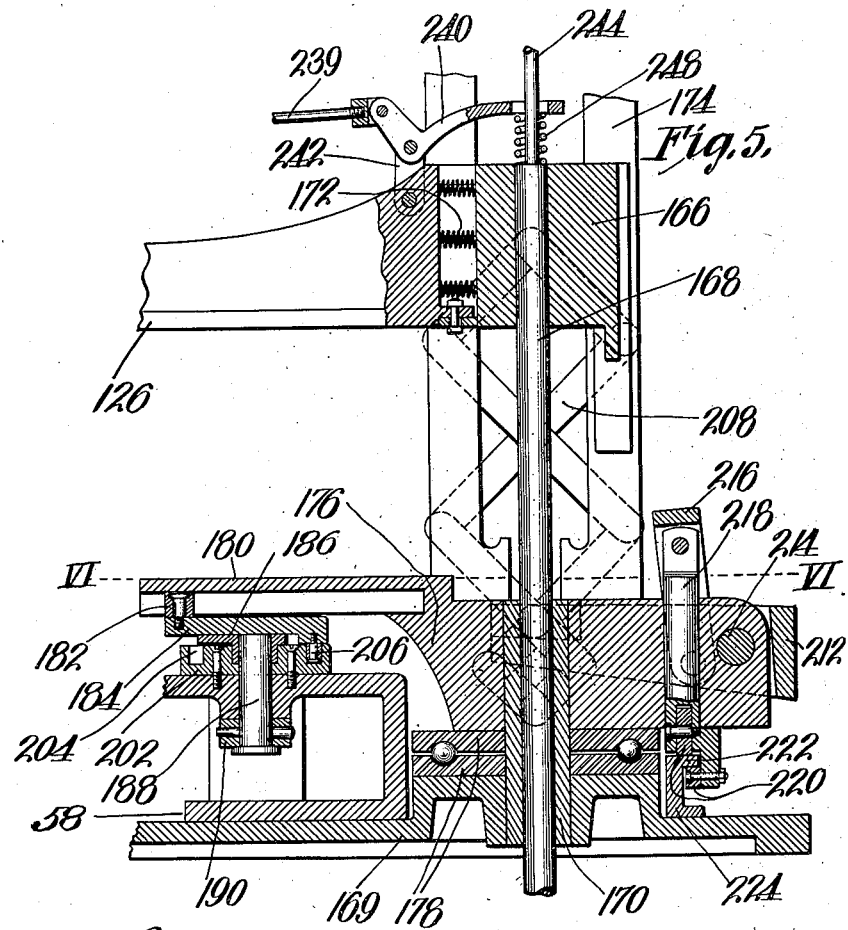
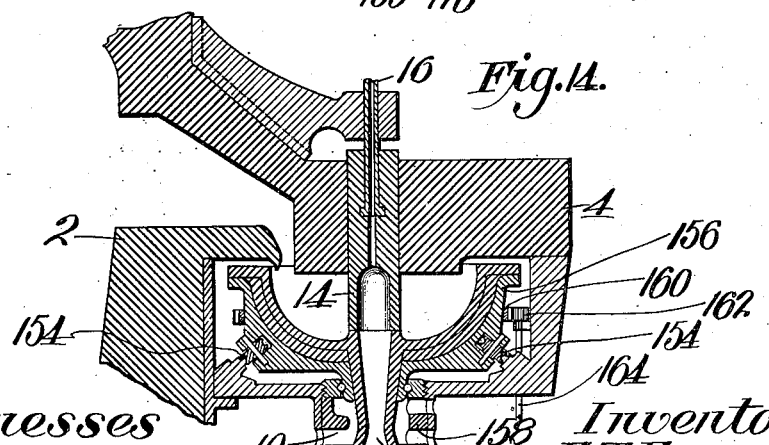

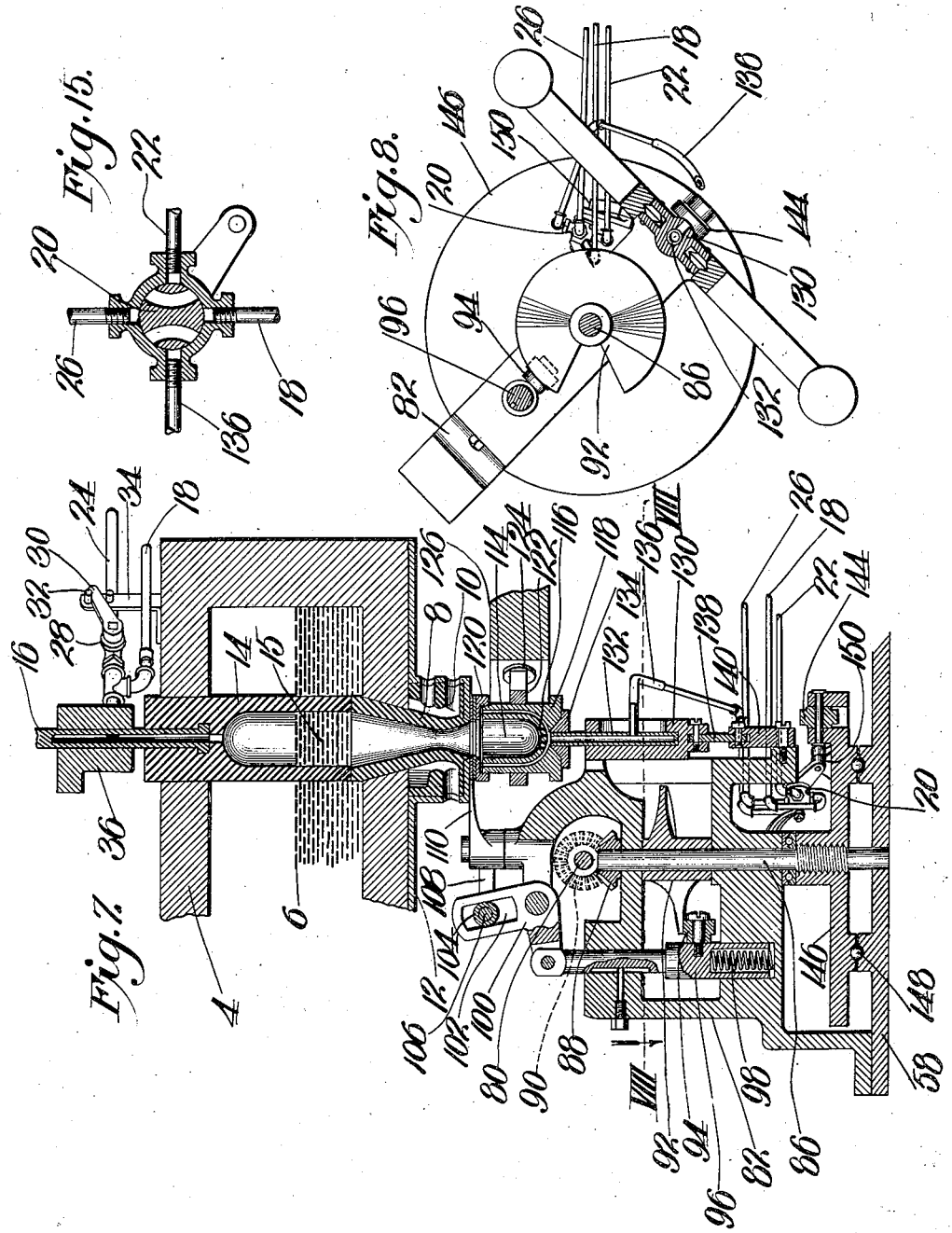

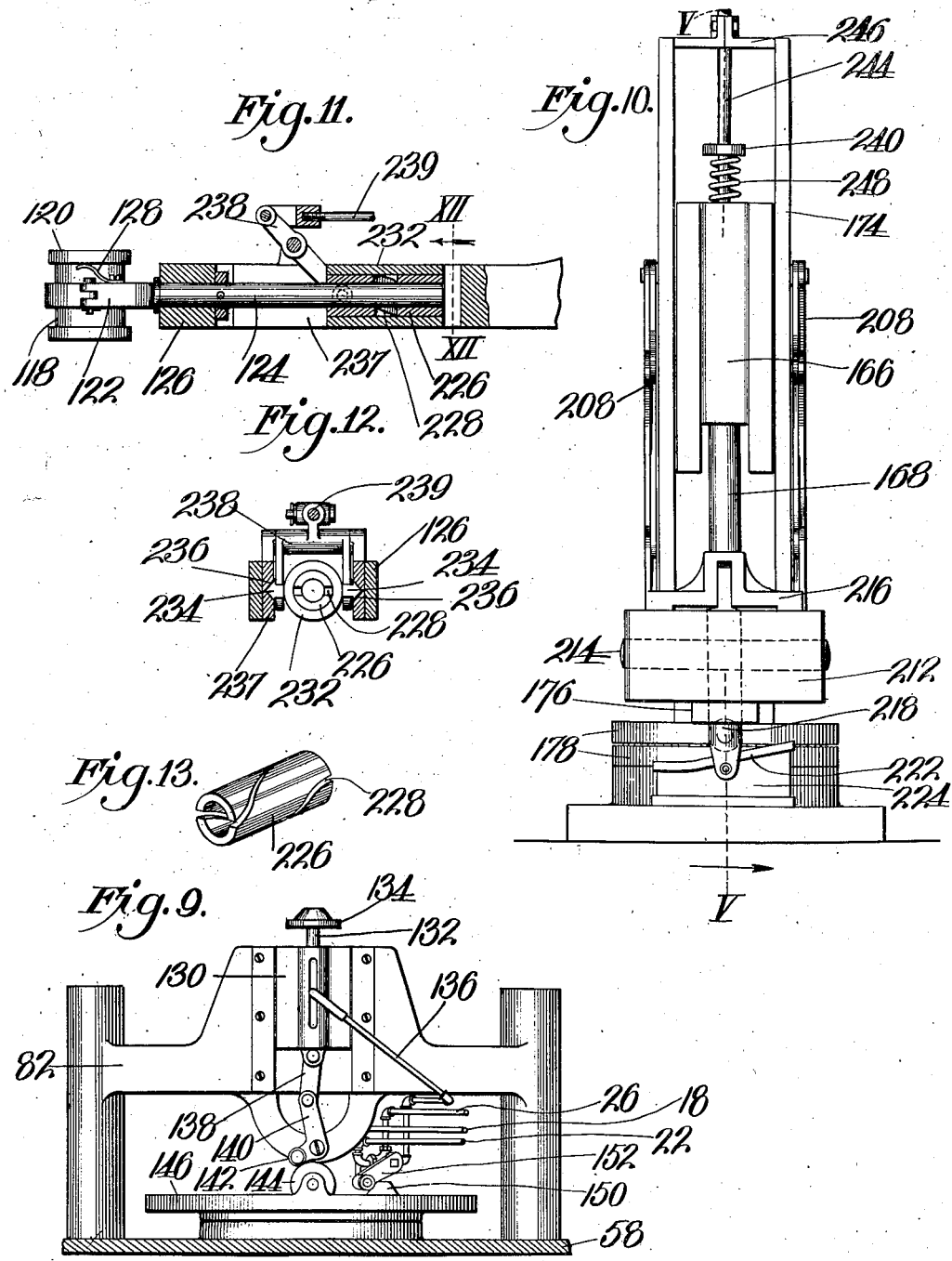
July 17, 1928.
E. T. FERNGREN
1,677,436
GLASS FEEDING AND DELIVERING MECHANISM AND PROCESS
Original Filed Sept. 29, 1913   7 Sheets-Sheet 7

Patented July 17, 1928.

1,677,436

UNITED STATES PATENT OFFICE.

ENOCH T. FERNGREN, OF BEAVER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE.

GLASS FEEDING AND DELIVERING MECHANISM AND PROCESS.

Application filed September 29, 1913, Serial No. 276,175. Renewed February 10, 1919.

This invention relates to method of and apparatus for feeding and delivering molten glass from glass furnaces and the principal object in view is to provide an improved method of and mechanical construction for handling the glass, in which compressed air and suction means are employed to facilitate the flow of the glass. In carrying out this object I employ an air bell for segregating a charge of the molten glass in the furnace and retaining this charge over the discharge opening by means of suction. I further employ a cup for receiving and delivering the glass, which cup is movable in a vertical line from below toward the discharge opening of the furnace from which the glass charge is transferred to the cup by means of suction produced within the latter at the same instant as compressed air is substituted for suction in the air bell. After the cup has received its charge it is removed from the discharge opening of the furnace to the location of the molds and there inverted to discharge its contents into the molds provided therefor.
Another object is to minimize the chilling imparted by shearing knives when severing a molded quantity of glass from its supply in the nozzle, which object is accomplished by vertically withdrawing the mold from its charging position with the mouth of the nozzle, whereby the glass that connects is nearly pulled apart or almost cleft along a transverse cross-sectional plane, but leaving a small diameter stem of tension or stretched glass between the glass in the mold and the glass in the nozzle mouth, whereby less glass is exposed to the shearing knives.

With these objects in view, the invention consists in certain novel and peculiar features of construction and organization as hereinafter described and pointed out in the appended claims, and in order that it may be fully understood reference is to be had to the accompanying drawings, in which:—

Fig. 2 is a vertical section along the line II—II of Figure 1.

Fig. 3 is a plan view on an enlarged scale of the parts shown at the middle of Figure 2, being partly in section along the line III—III.

Fig. 4 is an end elevation of the apparatus looking at the same from the left in Figure 2, being partly in section along the line IV—IV.

Fig. 5 is a vertical section taken on an enlarged scale along the line V—V of Figure 10, certain of the parts being shown in altered position.

Fig. 6 is a horizontal section on the line VI—VI of Figure 5.

Fig. 7 is a vertical section on an enlarged scale along the line VII—VII of Figure 1.

Fig. 8 is a horizontal section on the line VIII—VIII of Figure 7.

Fig. 9 is a side elevation of the stand which carries the devices for operating the knives and locking the feed cup, being the same parts as shown in Figure 8 and in the lower half of Figure 7.

Fig. 10 is an end elevation of the feed cup transferring mechanism.

Fig. 11 is a section through the end portion of the feed cup transferring arm being along the line XI—XI of Figure 3.

Fig. 12 is a section along the line XII—XII of Figure 11.

Fig. 13 is a perspective view of the feed cup reversing sleeve.

Fig. 14 is a vertical section showing a modified form of furnace extension.

Fig. 15 is a diagram showing the relative arrangement of certain of the air pipe connections.

Figure 1:
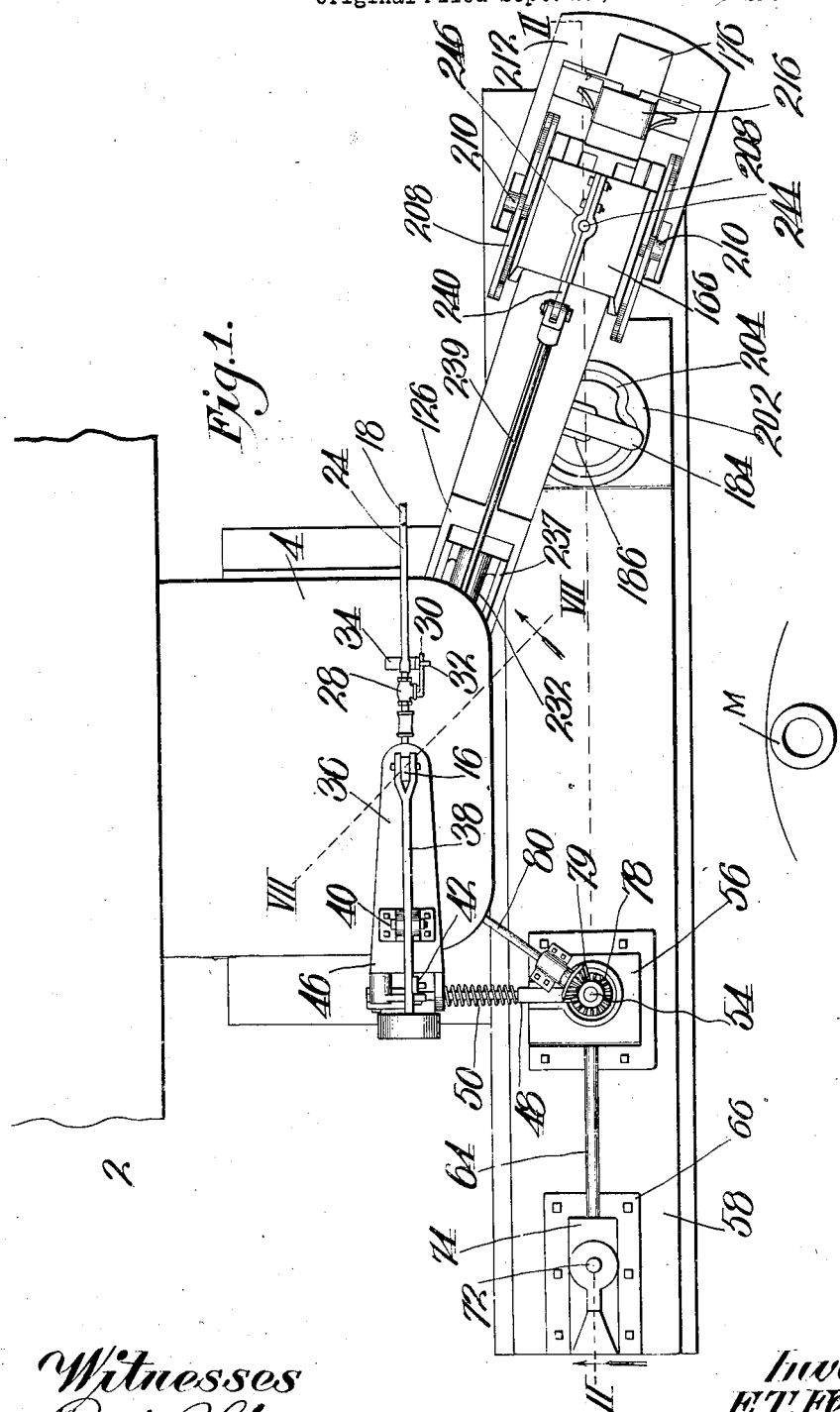
Fig. 1 is a plan view of the apparatus.

In the drawings the furnace 2 is shown as provided with an extension 4 providing a feed reservoir in communication with the furnace proper and in which the molten glass 6 (Fig. 7) stands at the same level as in the furnace. The extension is provided with a discharge opening within which is fitted a nozzle 8 the outer portion of which is formed with a series of openings 10 through which the flame from a blow torch or other heating means, not shown, may be directed against the stem of the nozzle to maintain the molten condition of the glass in the nozzle.

A metallic shell 12 is provided for enclosing the base of the extension 4 and the outer portion of the nozzle with the exception of its discharge opening and the openings 10.

Operating within the reservoir and mounted slidingly through the top of the extension 4 is an air bell 14 the lower end of which may fit the inner end of the nozzle 8 for the purpose of segregating a charge 15 of the glass for every operation of the bell, or if not in fitting contact with the end of nozzle 8, to partially segregate a portion of the molten glass from the surrounding mass above said discharge nozzle. The bell is placed in communication through a tube 16, pipe 18, valve 20 and pipe 22 with a source of compressed air, not shown, whereby upon operation of the valve, as hereinafter explained, the force of compressed air may be made one factor in ejecting the charge 15 out through the nozzle. The tube 16 is also in communication with the pipe 24 leading to a pipe 26 communicating with a vacuum pump, not shown, whereby upon operation of a valve 28 in pipe 24, a partial vacuum may be created in the bell for the purpose of supporting the charge 15. The valve 28 is provided with a crank 30 for engagement with pins 32 on a bracket 34 supported on the extension 4 so that the valve is opened on lowering of the bell and closed on reverse movement thereof.

The tube 16 is slidingly mounted in the end of the arm 36 which overhangs the extension 4 and the upper end of the tube 16 is pivotally and slidingly connected to one end of the counterbalanced arm 38 which is pivoted in a bracket 40 carried by the arm 36. (See Figs. 2 and 4.) The arm 38 is connected by a link 42 to the bell crank 44 mounted on the standard 46 which supports the arm 36. The bell crank connects pivotally and slidingly with the plunger rod 48 which is slidingly mounted in the standard 46 and forced by a spring 50 to operate the connections with the air bell to lower the latter. The bell is lifted by movement of said rod in the opposite direction by means of a cam 52 mounted on a shaft 54 (Fig. 3) which is carried vertically in bearings provided in a bearing frame 56 and the bed frame 58 of the apparatus. This shaft carries a bevel gear 60 (Fig. 2) meshing with a similar gear 62 on a shaft 64 journaled at one end in the frame 56 and at its opposite end in a bearing bracket 66 at which end it is provided with a bevel gear 68 for engagement with the similar gear 70 on a shaft 72 carried by the bearing stand 74. The latter shaft is provided with a suitable clutch 76 and may be connected with any suitable power transmission means, not shown. The shaft 54 also carries adjacent the cam 52, a bevel gear 78 engaging a bevel gear 79 on a shaft 80 mounted angularly in bearings provided respectively in the frame 56 and the bearing stand 82 located beneath the extension 4 adjacent the nozzle 8. Journaled upright in this stand is a shaft 86 (Fig. 7) provided with a bevel gear 88 meshing with the similar gear 90 on the adjacent end of the shaft 80. The shaft 86 has also secured thereto a cam 92 adapted to engage a roller 94 carried by the plunger rod 96 which slides vertically in said stand 82. When released by the cam said plunger is actuated by a spring 98 to operate a bell crank 100 mounted on the stand 82 and pivotally connected to the upper end of the plunger. One arm of the bell crank is provided with a slot 102 for receiving a roller 104 journaled on a link 106, which with a pair of links 108 (Fig. 3) forms a toggle lever for operating a pair of knives 110 pivotally mounted on the stand 82 and provided with openings 112 adapted to register with the discharge opening of the nozzle 8. It will be understood that at the proper intervals the spring 98 is permitted to actuate the plunger to operate the knives, in which operation they move their openings out of register with the nozzle whereby any excess glass flow or connecting stem of glass is severed with a shearlike action from the charge which has been expelled into the feed cup 114.

The openings 112, in knives 110, may be made large enough to permit the free passage of the cup carrying shell 118 into contact with feed nozzle 8. When the cup carrying shell has been charged it drops enough to permit the knives to shear the glass.

This feed cup is provided with bottom perforations 116, (Fig. 7), and is carried within a cylindrical shell 118 having a removable cap 120 in which is a suitable opening to register with the openings 112 of the knives. The shell 118 also has a bottom opening for air transmission as hereinafter explained. The shell is removably and slidingly mounted within a hinged collar 122 (Fig. 2) at the end of a shaft 124 mounted in the end of a swinging transferring arm 126, said collar having leaf springs 128 at opposite sides of its center for engagement with the cap 120 for supporting the shell when the feed cup is charged and descends from its receiving position, see Figure 2. Beneath the feed cup when the same is in charge receiving position are provided connections carried by the stand 82 for momentarily locking the shell 118 with its feed cup in register with the discharge opening of the nozzle, which connections also provide means for transmitting suction to said cup.

Referring to Figs. 7 and 9, a plunger 130 operates vertically in the stand 82 and carries a tube 132 provided at its top with an apertured disk 134 adapted to fit the base of the shell 118. This tube is in communication through a tube 136 with the valve 20 controlling communication with the suction tube 26. Connected with the lower end of the plunger 130 is a link 138 which is connected with one arm of the bell crank 140 and forms therewith a toggle lever for raising and lowering the plunger. This bell crank carries a roller 142 adapted to be engaged by a roller 144 which is journaled on the outer edge of a rotating disk 146 secured to the lower end of the shaft 86 and provided with roller bearings 148 on the bed frame 58. From this arrangement it will be seen that, for each revolution of the disk 146, the roller 144 will operate the bell crank and cause the plunger 130 to lock the shell in charge receiving position, at the same time placing the tube 132 in communication with the interior of said shell. Immediately after locking the parts in this position, a cam lug 150 also carried by the disk 146 operates a crank arm 152 for momentarily opening the spring closed valve 20 whereby, as will be seen from the diagram in Figure 15, the feed cup is subjected to the influence of suction from the pipe 26 at the same time as pressure is admitted through the pipes 22 and 18 to the air bell, as a consequence of which the charge 15 is immediately shot from the bell through the nozzle into the cup 114. Perforations 116 in the bottom of the feed cup permit the escape of the air but are small enough to prevent the escape of any of the glass because of the viscous character of the latter.

It will be apparent that the vacuum action in the air bell portion of the apparatus may be dispensed with except in cases where the glass is at such a high temperature as to flow very freely. The operation of suction through the base of the feed cup is important, however, aside from its mechanical action in effecting the discharge of the glass, for it removes substantially all the air from the cup and thereby avoids the production of any air bubbles in the glass charge.

While constant heating of the nozzle at the discharge point is also an important feature, it will be observed that, if the operation of feeding can be made substantially continuous, then this necessity of delivering extra heat may also be in a large degree obviated since the nozzle will then be maintained at a high temperature by the heat from the glass flow.

In Fig. 14 I show a modification operating on the same principle as above described with the exception that I mount on roller bearings 154 within the extension 4, a rotary bowl 156 containing the feed reservoir. In this modification the nozzle 8 is formed integral with the bowl and is heated in the same manner through openings 10 in a separate casing 158. The bowl is provided externally with a gear 160 which meshes with a gear 162 on a shaft 164 which may be driven in any convenient manner. By thus rotating the bowl the glass in the feed reservoir is maintained at an even heat and of uniform fluidic consistency throughout so as to flow or gravitate toward the discharge opening of the bowl.

Referring now more particularly to Figs. 2, 5 and 11, illustrating the means for transferring the feed cup and its charge to the point of location of the molds m (Fig. 1), the arm 126 is shown as hinged at its rear end to a block 166 carried by a shaft 168 mounted to slide vertically in the bearing sleeve 170 supported in the bed plate 169. The hinge connection between said arm and block is made sufficiently loose, see Fig. 5, to provide for a slight vertical play of the arm against springs 172 interposed between the block and adjacent end of the arm. To assist in guiding the block 166 in its vertical movement as well as to impart swinging movement thereto a yoke frame 174 is provided, supported on a block 176 which is journaled for rotary movement about the sleeve 170 and carried on ball bearing plates 178 interposed between the said block and the bed plate. The block 176 has a grooved extension 180 for engaging a roller 182 on a sliding crank arm 184 which fits the channel of the plate 186 (Figs. 1 and 6) secured to the upper end of a short vertical shaft 188 journaled in the bed frame 58. This shaft 188 is rotated by means of a crank arm 190 which is connected by a link 192 with a crank arm 194 at the lower end of the shaft 54 and also with a crank 196 carried by a shaft 198 journaled in the frame 58 in vertical alignment with shaft 72 and provided with a bevel gear 200 meshing with the gear 68. A stationary cam 202 is secured to the bed frame about the shaft 188 and is provided with a groove 204 for receiving a roller 206 carried by the crank 184, said groove 204 being of such outline, see Figure 6, as to cause the crank 184 to swing the extension 180 and consequently arm 126 toward and away from the furnace, and allow said extension and arm 126 a slight pause at each end of their swinging movement.

As the arm 126 moves away from the furnace, it is also given a vertical movement by the following mechanism:

Secured to the block 166 are the upper links of a pair of lazy tongs 208, the lower links of which are pivoted to the block 176. For operating the lazy tongs the latter are provided near their lower ends with a pair of rollers 210 engaged by the ends of a yoke lever 212 pivoted at 214 to the block 176. The lever 212 is raised and lowered by means of a yoke 216 pivoted to the sides of the lever 212 and also to a rod 218 mounted slidingly in the block 176 and provided with rollers 220 for engaging the opposite sides of an inclined cam surface 222 which is formed on a plate 224 secured to the base plate. From this it will be apparent that as the block 176 is turned the rod 218 will be reciprocated due to the cam surface and thereby operate the lazy tongs to raise or lower the arm 126. At the outer limit of the arm's movement at the point where the charge 15 is to be delivered, it is necessary to reverse the cup and this is accomplished by the following means:

The inner end of the shaft 124 is fitted with a sleeve 226, see Figure 13, having helical grooves 228 in which operate pins provided on the interior of a sleeve 232, the exterior of which sleeve is provided with pins 234 having heads fitting in guide grooves 236 formed in wear plates 237 carried by the arm 126. By means of this construction whenever the sleeve 232 is reciprocated the sleeve 226 is rotated, thereby rotating shaft 124 and inverting the feed cup. The sleeve 232 is reciprocated by means of a lever 238 pivoted upon the arm 126 and engaging shanks of the pins 234, said lever being provided with a link connection 239 with the lever 240 which latter is pivotally connected by the link 242 to the arm 126 and also provided with a slot which receives a guide pin 244 projecting from the shaft 168 and through the top plate 246 of the frame 174. Intermediate the slotted arm of the lever 240 and the adjacent face of the block 160 is interposed a spring 248, the same being coiled about the guide pin 244. It will be noted that the cup is inverted when the arm 126 is swung out from the furnace, at which time the lever 126 is also raised thereby forcing the lever 240 against the plate 246, thus operating the lever to reciprocate the sleeve 232. It will also be observed that the feed cup is given a sharp jar upon being inverted whereby its contents are more effectively discharged. This is due to the shell which encloses said cup being slidingly mounted in the collar 122 so that when the shaft 124 is turned the shell drops until its bottom flange is stopped by said collar and the shock thus incurred insures the proper discharge of the contents of the cup. Upon the return of the cup to the nozzle 8, during which return movement the arm 126 is lowered, the lever 240 is again operated in the reverse direction by the action of spring 248 whereby the feed cup is restored to receiving position.

In operating the apparatus with compressed air back of the outflowing glass and with a vacuum action in the feed cup, the procedures are as follows: A quantity of glass is admitted into the nozzle when the air bell is elevated. Meanwhile the feed cup is brought into position for a vertical elevation below the mouth of the nozzle. The segregated or partially portioned off glass in nozzle is prevented from flowing out through the delivery opening thereof by a temporary vacuum condition in the air bell. Air pressure is then applied on the glass in the nozzle while the air in the feed cup is exhausted, which combined force action upon the glass causes a very rapid filling of the feed cup. The next instant the differential fluid pressure action is discontinued and the mold cup moves downwardly a short distance below the nozzle mouth, causing the glass to tension and string to a very small diameter stem between the mouth of the mold and the mouth of the nozzle, where the shearing knives instantly sever it during the tension produced by the downward movement of the feed cup. The severing of the tension stem causes each end thereof to rebound to its respective source. The charge of glass in the mold cup is moved transversely from under the nozzle and diagonally upward, during which motion the mold cup is completely inverted by the time it reaches a discharging position over a shaping mold, whereby an arresting shock is imparted to the feed cup dislodging the measure of glass into the mold.

From the foregoing it is believed that the operation of the apparatus will be clear without a more extended explanation, accordingly I will now proceed to designate those particular features of the apparatus which I regard as new, it being understood that I do not desire to be restricted to the exact details of construction shown and described, but reserve the right to all changes falling within the spirit and scope of the appended claims.

I claim:

1. In an apparatus of the character described, the combination of a receptacle for molten glass and provided with a downwardly directed discharge opening, means for segregating a charge of glass for discharge through said opening, suction means for sustaining said charge of glass over said opening, means for releasing said sustaining suction, and means for producing a vacuum action ahead of the charge to expel the same through said opening.

2. In an apparatus of the character described, the combination of a receptacle for molten glass and provided with a downwardly directed discharge opening, means for segregating a charge of glass at said discharge opening, suction means for sustaining said charge over said opening, means for introducing fluid pressure behind said charge, and means for producing a vacuum action ahead of said charge to expel the charge through said opening, said means for introducing fluid pressure and the means for producing a vacuum operating simultaneously and cooperatively.

3. In an apparatus of the character described, the combination of a receptacle for molten glass and provided with a downwardly directed discharge opening, means for segregating a charge of glass and sustaining the same over said opening, a feed cup below said opening and fitting around the same, means for introducing fluid pressure behind said charge and means for producing a vacuum action through said feed cup and discharge opening to expel said charge into said cup; said means for introducing fluid pressure and the means for producing a vacuum operating simultaneously and cooperatively.

4. In an apparatus of the character described, the combination with a receptacle for molten glass and provided with a discharge opening, of a cup, supporting means for holding the cup to receive molten glass from said discharge opening and to withdraw it from below said opening, means to invert the cup while thus withdrawn to effect the discharge of its contents, and means whereby the cup is jarred while inverted to facilitate the discharge of its contents.

5. In an apparatus of the character described, the combination with a receptacle for molten glass and provided with a discharge opening facing downwardly, a laterally swinging support, a cup adapted to be held by said support at a point in the swinging movement thereof, below the said discharge opening, and means for clamping the cup firmly against the receptacle around said feed opening.

6. In an apparatus of the character described, the combination with a receptacle for molten glass and provided with a downwardly facing discharge opening, a movable support to underlie said opening at times, a cup carried by said support and adapted to receive molten glass from said discharge opening, yielding means interposed between the support and the cup to limit downward movement of the latter with respect to the former, and means to clamp the cup against said receptacle and around said discharge opening.

7. In an apparatus of the character described, the combination with a receptacle for molten glass and provided with a downwardly-facing discharge opening, of a cup, means for supporting the cup and disposing it below said discharge opening, means to lift the cup slightly after it has been thus disposed, and yielding means to take the weight of the cup and impose it on said support after the lifting means has been disengaged from the cup.

8. In an apparatus of the character described, a support, a cup-carrying shell disposed vertically and slidingly in said support, means to invert the shell to permit it to slide downward in the support, and means to suddenly check such downward movement.

9. In an apparatus of the character described, a support, a cup-carrying shell disposed vertically and slidingly in said support, means to invert the shell to permit it to slide downward in the support, and a projection from the shell to strike the support and thereby suddenly arrest the downward movement of the shell.

10. The combination with a receptacle for molten glass having a discharge opening through which molten glass may flow downwardly, a cup, means for moving the cup in an upward and downward direction and adapted to cause the cup to register and form an air tight connection with said opening, means for holding the cup against the receptacle, and means to sever the molten glass flowing from said opening into the cup after the latter starts to move downward.

11. In an apparatus of the character described, the combination of a receptacle for molten glass and provided with a discharge opening, a feed cup, a feed cup carrying member, means for intermittently moving said member toward and away from said discharge opening to bring the cup into charging position and thereafter into delivering position, and means acting automatically to invert said member and cup in the latter position, said carrying member and moving means being constructed and arranged to permit a slight dropping movement of said member and cup upon being inverted.

12. In a glass feeding and delivering mechanism, a feed cup, a feed cup carrying member, means for transferring said member and cup from charging position to delivering position, and means for inverting said member and cup in delivering position, said member and transferring means being constructed and arranged to permit a slight dropping movement of said member and cup upon being inverted.

13. In a glass feeding and delivering mechanism, a feed cup, a feed cup carrying member, said member being provided with top and bottom flanges, means for transferring said member and cup from charging position to delivering position, said means being provided with a device slidingly engaging said member between said flanges, and means for inverting said member and cup in delivering position, whereby said member and cup are permitted a slight dropping movement as said member slides upon said device.

14. The combination with a receptacle for molten glass having a downwardly opening discharge outlet, of a mold charge transfer cup adapted to cap the outlet to receive a charge of glass therefrom, means for oscillating the cup laterally toward and from said outlet and mechanically operated shears arranged to meet between the cup and the outlet to sever the glass in timed relation with the movement of the cup.

15. In an apparatus of the character described, the combination with a receptacle for molten glass, and provided with a downwardly-facing discharge opening, of a support, a cup-carrying shell adapted for vertical movement on the support, a head underlying the said discharge opening, and a toggle for raising the head until it forces the shell against the receptacle around the discharge opening.

16. In an apparatus of the character described, the combination with a receptacle for molten glass, and provided with a downwardly-facing discharge opening, of a support, a cup-carrying shell adapted for vertical movement on the support, a head underlying the said discharge opening, a toggle for raising the head until it forces the shell against the receptacle around the discharge opening, and rotating means to alternately engage the toggle to raise the head and release the toggle to lower the head.

17. In an apparatus of the character described, the combination with a receptacle for molten glass, and provided with a downwardly-facing discharge opening, of a support, a tubular shell adapted for vertical movement on the support, a cup within the shell and provided with a perforated bottom, a head underlying the shell, means for raising the shell and clamping it around the opening and against the bottom of the receptacle, and means for producing a vacuum through said head and within said cup to effect the discharge of molten glass from the receptacle into the cup.

18. In an apparatus of the character described, the combination of a receptacle for molten glass provided with a downwardly-facing discharge opening, a cup supported beneath said opening, a pair of perforated knives arranged between the cup and the bottom of the receptacle with their perforations in communication with said discharge opening and said cup, and means for operating said knives to shear molten glass extending through their perforations.

19. In an apparatus of the character described, a support, a shaft carried by and journalled therein, a cup carried by said shaft, means for sliding said shaft endwise, and means to rotate said shaft in one direction to invert the cup and in the reverse direction to restore it to upright position.

20. In apparatus for separating charges of molten glass, a container having a discharge outlet, a charge shaping transfer cup adapted to form a pneumatic working connection with the outlet, means for producing an abnormal pressure in said cup when in charge-receiving position at the outlet, means for supporting the cup and for oscillating the same laterally toward and away from the outlet, and mechanically operated shears arranged to meet between the cup and the outlet to sever the glass in timed relation with the movement of the cup.

21. In apparatus for separating charges of molten glass, a container having a discharge outlet, a charge-receiving transfer cup adapted to form a pneumatic working connection with the outlet, a laterally swinging support for said cup arranged to oscillate the cup toward and from said outlet, and means to rotate the cup whereby the same is brought into charge-receiving position at the outlet, and is inverted when displaced from said outlet to discharge its contents.

22. In an apparatus for separating molten glass into mold charges, the combination of a receptacle for the glass having a submerged outlet, a member within the receptacle having a chamber opening toward the outlet, and having its lower edge submerged in the glass, and automatic means operating in a predetermined order and time, for periodically creating a vacuum within the chamber to prevent the discharge of glass from the outlet, and for supplying compressed air to the chamber to discharge the glass from the outlet.

23. In an apparatus for separating molten glass into mold charges, the combination of a receptacle for the glass having an outlet, a mold charge transfer cup adapted to form a pneumatic working connection with the outlet and enclose glass discharging from said outlet, means for raising and lowering the cup toward and from the outlet, means for varying the pressure in the cup for producing a differential pressure between the interior of the cup and the interior of the receptacle, and mechanically operated shears for severing the glass beneath the outlet, said shears being automatically actuated when the cup is lowered from said outlet.

24. In apparatus for separating molten glass into mold charges, the combination of a receptacle for the glass having a discharge outlet, severing means operating periodically beneath the outlet, means beneath the outlet for supporting the discharged glass, and means for lowering the supporting means in timed relation to the operation of the severing means to attentuate the glass between the supporting means and the outlet.

25. The combination with means for supplying a flow of molten glass, of means for segregating the glass into individual masses, a glass forming machine comprising a series of molds, and a transfer cup arranged to receive said charges and transfer them to a position over the molds and drop them into the molds.

26. In apparatus for separating molten glass into mold charges, comprising a receptacle for the glass having a submerged discharge outlet, the combination of a transfer cup, means for raising the cup into pneumatic working connection with the outlet, and for lowering the cup from said outlet, means for periodically producing a partial vacuum in the cup, and shears arranged to close above the cup for severing the glass between the cup and the outlet in timed relation to the said movements of the cup.

27. In apparatus for separating molten glass into mold charges, comprising a receptacle for the glass having a submerged discharge outlet, the combination of a member projecting into the glass above the outlet and movable in vertical alignment therewith, means for moving said member periodically, a mold charge transfer cup, means for swinging the cup into and out of position to cap the outlet in timed relation to the movements of the said member, means for periodically varying the pressure in the cup in timed relation to the movements of said member, and shears arranged to close above the cup for severing mold charges from the discharged glass in timed relation to the said movements of the cup.

28. The combination of a receptacle to contain molten glass, having an outlet orifice in the bottom thereof, a regulator projecting downward into the glass above said orifice, means to reciprocate said regulator vertically, a forming cup, means to periodically move said cup into position beneath said orifice in synchronism with the movements of the regulator, and means to exhaust the air from said forming cup.

29. A molten glass supply having a submerged opening, relatively movable means for withdrawing molten glass from the supply through said opening, said means being movable laterally to a position adjacent said opening and then directly toward said opening into sealing position at said opening and then downward, and a shear operable relatively to the means for severing the molten glass from said means.

30. A glass tank having an overhanging portion provided with a bottom opening therefrom, means for intermittently removing glass from said opening, said means being movable laterally to a position adjacent said opening and then directly toward said opening into sealing position at said opening and then downward, and a shear operable relatively to the means for severing the molten glass from said means.

31. A glass tank having a pool of molten glass, said tank having a projecting portion into which the pool extends, said portion being provided with a bottom outlet, relatively movable means for withdrawing material from the pool through the outlet, said means being movable laterally to a position adjacent said outlet, and then directly toward said outlet into sealing position at said outlet and then downward, and a shear operable relatively to the means for severing the molten glass from said means.

32. A glass tank having a pool of molten glass, said tank having a projecting portion into which the pool extends, said portion being provided with a bottom outlet, suction means for withdrawing material from the pool through the outlet, said means being movable laterally to a position adjacent said outlet, and then directly toward said outlet into sealing position at said outlet and then downward, and a shear operable relatively to the means for severing the molten glass from said means.

33. A glass tank having a pool of molten glass, said tank having a projecting portion into which the pool extends, said portion being provided with a bottom outlet, intermittently operable means for withdrawing material from the pool through the outlet, said means being movable laterally to a position adjacent said outlet, and then directly toward said outlet into sealing position at said outlet and then downward, and a shear operable relatively to the means for severing the molten glass from said means.

34. A glass tank having a pool of molten glass, said tank having a projecting portion into which the pool extends, said portion being provided with a bottom outlet, intermittently operable suction means for withdrawing material from the pool through the outlet, said means being movable laterally to a position adjacent said outlet, and then directly toward said outlet into sealing position at said outlet and then downward, and a shear operable relatively to the means for severing the molten glass from said means.

35. A glass forming mechanism, a molten glass supply having a flow-off outlet, a suction gatherer therebetween movable directly toward said outlet into sealing communication with said outlet, and power mechanism for the gatherer to remove glass from the supply and deliver to the forming mechanism.

36. A glass supply tank having a submerged outlet, a gather receiving vessel horizontally movable into position to said outlet then vertically movable into sealing position at said outlet, and relatively movable suction means for drawing glass from the tank into the vessel and operable when the vessel is in receiving position at the tank, and a shear operable relatively to the vessel and the outlet and between the vessel and outlet for cutting off a gather of glass for the vessel.

37. A gatherer comprising a rotary carrier, a receiving vessel mounted on the carrier, a supply having a flow-off outlet, means for shifting the vessel as to the carrier into position at the outlet, intermittent driving means for the carrier, and a shear operable relatively to the vessel and the outlet and between the vessel and outlet for cutting off a gather of glass for the vessel.

38. A glass tank having a submerged outlet, a gather receiving vessel laterally shiftable into position as to the tank and then directly movable toward said outlet to seal said outlet, and a shear operable relatively to the vessel and the outlet and between the vessel and outlet for cutting off a gather of glass for the vessel.

39. A glass tank having a submerged outlet, a gather receiving vessel laterally shiftable into position as to the tank and then directly movable toward said outlet to seal said outlet, suction means coacting through the vessel to draw glass from the tank through the outlet into the vessel, and a shear operable relatively to the vessel and the outlet and between the vessel and outlet for cutting off a gather of glass for the vessel.

40. A glass tank having a submerged outlet, a gather receiving vessel, means for horizontally shifting the vessel into position at said outlet and then vertically shifting the vessel to seal the outlet from the tank, suction means coacting through the vessel to draw glass from the tank through the outlet into the vessel, and a shear operable relatively to the vessel and the outlet and between the vessel and outlet for cutting off a gather of glass for the vessel.

41. A glass tank having a submerged outlet, a gather receiving vessel, means for shifting the vessel horizontally into position at the outlet and then vertically to seal the outlet from the tank, suction means coacting through the vessel to draw glass from the tank through the outlet into the vessel, and a pair of relatively movable shear members movable relatively to the outlet and vessel and coacting upon recession of the vessel from the outlet to cut off a charge of glass in the vessel from the tank.

42. A glass tank having a submerged outlet, a gather receiving vessel, means for shifting the vessel into position to seal the outlet from the tank, suction means coacting through the vessel to draw glass from the tank through the outlet into the vessel, a pair of relatively movable shear members movable relatively to the outlet and vessel and coacting upon movement of the vessel from the outlet to cut off a charge of glass in the vessel from the tank, and means for shifting the charge carrying vessel laterally from the outlet.

43. A glass tank having a submerged outlet, a gather-receiving transfer vessel, means for horizontally shifting the vessel to position adjacent the outlet and then lifting the vessel into position to seal the outlet from the atmosphere and mechanically operated shears mounted relatively to the vessel and the outlet, and between the vessel and outlet, said shears being arranged to meet beneath the outlet for cutting off a gather of glass for the vessel.

44. A glass tank having a submerged outlet, a charge-receiving vessel, means for shifting the vessel into position to seal the outlet from the tank, suction means coacting through the vessel, mechanism for effecting downward movement of the vessel from the outlet, a pair of movable shears to cut off a charge of glass discharged into the vessel from the tank, a mold, driving means for shifting the vessel, carrying the cut-off charge laterally into position over the mold, and means for actuating the vessel to effect a transfer of the glass contained therein to the mold.

45. The combination of a container for molten glass having a submerged outlet, a charge-enclosing cup, means for moving the cup horizontally toward and away from the axis of the outlet, a fixed support, a head mounted for vertical movement upon said support, means for moving the head into contact with and cooperative relation with the bottom of said cup when said cup is in axial alignment with said outlet, means for establishing a subatmospheric pressure within the cup to aid the discharge of glass from the outlet, means for severing the glass between the outlet and cup subsequent to the establishment of the subatmospheric pressure within the cup, and means for operating the cup, head and severing means in timed relation.

46. In apparatus for separating molten glass into mold charges, a receptacle having a discharge outlet, a charge-shaping cup arranged to connect with the outlet in charge-receiving relation, a laterally swinging support for supporting the cup, a shaft carried by the support and connected to said cup, and means associated with the support for rotating said shaft to invert the cup to discharge its contents when displaced laterally from the outlet and also to restore said cup to its charge-receiving position when returned beneath the outlet.

47. In apparatus for delivering charges of molten glass from a container having a downwardly opening discharge outlet, a laterally swinging support, a charge-receiving cup arranged to connect with the outlet, means including a hinged clamp for detachably mounting the cup on said support, and means for swinging the support.

48. In apparatus for separating molten glass into mold charges, the combination with a receptacle having a downwardly opening discharge outlet, of a laterally swinging support, a cup-carrying shell detachably mounted on said support, a charge-shaping cup located within said shell, said cup having perforations communicating with the shell, and means for creating a differential pressure in the cup when the cup-carrying shell is placed in close communication with the outlet.

49. A glass tank having a submerged outlet, a mold-charge shaping cup, automatically operated means for horizontally shifting the cup to a position beneath the outlet, automatically operated means for raising the cup in sealing relation with the outlet, automatically operated suction means coacting through the cup and operated in timed relation with the cup movements for drawing glass from the supply in the tank, automatically operated means for then lowering the cup to attenuate the glass between the outlet and the cup, shear means operable automatically in timed relation with the cup movements to sever the attenuated glass, and automatically operated means for discharging the contents of the cup.

50. The method of working glass which consists in providing a mold charge receiving receptacle and periodically locating the same adjacent to a glass delivery outfit, establishing sub-atmospheric pressure in said receptacle, delivering a mass of glass to said receptacle during the maintenance of the sub-atmospheric pressure within the receptacle, and applying air under pressure above the mold charge from above the outlet during the maintenance of the sub-atmospheric pressure, thereby forcing the glass downwardly into said receptacle and into uniform contact with substantially all portions thereof.

51. In apparatus for feeding molten glass, a glass container having a downwardly opening delivery outlet, means oscillated laterally to and from the line of flow from said outlet and movable vertically beneath the outlet to and from position for receiving glass issuing through the outlet, and means disposed constantly beneath said outlet and movable relatively to the glass-receiving means to and from position to temporarily maintain said glass-receiving means in its said glass receiving position.

52. In apparatus for feeding molten glass, a glass container having a discharge outlet, means movable to and from position beneath said outlet to support glass discharged through said outlet, and means disposed beneath said outlet constantly and movable into and out of contact with said glass supporting means for periodically locking said supporting means against movement relatively to said outlet.

53. In apparatus for feeding molten glass, a glass container having a discharge outlet, a mold charge transfer cup oscillated laterally to and from a position below said outlet for supporting glass discharged through said outlet, and movable means disposed constantly beneath said outlet and movable to and from position to periodically lock said supporting means against movement relatively to said outlet.

54. In apparatus for feeding molten glass, a glass container having a discharge outlet, means movable beneath said outlet for supporting and confining glass discharged through said outlet, and means constantly below said outlet movable vertically into and out of engagement with said glass supporting means for periodically raising said supporting means into capping relation with the outlet and for locking said supporting means against movement from said outlet capping position.

55. In apparatus for feeding molten glass, a glass container having a discharge outlet, a member movable beneath said outlet for supporting and confining glass discharged through said outlet, and means disposed constantly below said outlet for periodically locking said supporting member against movement relatively to said outlet, and for simultaneously causing a suction within said glass supporting and confining member.

56. In apparatus for feeding molten glass, a glass container having a delivery outlet in its base, glass supporting means movable below the outlet in the line of flow of the glass discharged through the outlet, and means disposed contantly below said outlet and movable relatively to the supporting means for periodically maintaining said glass supporting means in a position close to said outlet and for locking said glass supporting means against movement relatively to the outlet.

57. In apparatus for feeding molten glass, a glass container having a delivery outlet in its base, glass supporting means movable to and from position to cap said outlet and then to support glass discharged through the outlet, and other means disposed constantly below the outlet and movable into engagement with the glass supporting means for raising said glass supporting means to said capping position and for temporarily maintaining said supporting means in such position.

58. In apparatus for feeding molten glass, a glass container having a delivery outlet in its base, glass supporting means movable vertically below the outlet in the line of flow of the glass discharged through the outlet, and other means located constantly below said outlet for temporarily engaging and maintaining said supporting means at the upper limit of its vertical movement so that said supporting means is locked against movement relatively to the outlet, and simultaneously causing a suction in said glass supporting and confining means.

59. The method of feeding molten glass, which comprises passing glass downwardly through an outlet in a container and past a shearing plane below said container to a receiving receptacle, forming a seal at the top of the receptacle against the admission of air thereinto, exhausting the air from the cavity of the receptacle whereby the entrance of the glass into the receptacle is facilitated, then breaking the seal, attenuating the glass at the shearing plane and severing the glass at the attenuated portion.

60. Apparatus for feeding molten glass, comprising a container for the glass having a downwardly opening discharge outlet, stationary heating means adjacent to and surrounding said outlet for preventing the accumulation of chilled glass at said outlet, a mold charge transfer cup adapted to cap the outlet to receive a charge of glass therefrom, means for oscillating said cup laterally toward and from said outlet, and mechanically operated shears arranged to meet between the cup and the outlet to sever the glass in timed relation with the movement of the cup.

61. Apparatus for feeding molten glass, comprising a container for the glass having a downwardly opening discharge outlet, stationary heating means adjacent to and surrounding said outlet for preventing the accumulation of chilled glass at said outlet, a mold charge transfer cup adapted to cap the outlet to receive a charge of glass therefrom, means for oscillating the cup laterally toward and from said outlet, means for causing said cup to assist in controlling the issue of glass through said outlet, and mechanically operated shears arranged to meet between the cup and the outlet to sever the glass in timed relation with the movement of the cup.

62. Apparatus for feeding molten glass, comprising a container for the glass having a downwardly opening discharge outlet, stationary heating means adjacent to and surrounding said outlet for preventing the accumulation of chilled glass at said outlet, a mold charge transfer cup adapted to cap the outlet to receive a charge of glass therefrom, means for oscillating the cup laterally toward and from the outlet, means for creating a differential fluid pressure at opposite ends of the glass discharging into said cup, while said cup is below said outlet, and for thereby assisting in controlling the issue of glass through said outlet, and mechanically operated shears arranged to meet between the cup and the outlet to sever the glass in timed relation with the movement of the cup.

63. Apparatus for feeding molten glass, comprising a container for the glass having a downwardly opening discharge outlet, stationary heating means adjacent to and surrounding said outlet for preventing the accumulation of chilled glass at said outlet, a mold charge transfer cup adapted to cap the outlet to receive a charge of glass therefrom, means for oscillating the cup laterally toward and from said outlet, means for creating an abnormal fluid pressure within said cup, while said cup is in capping relation to said outlet, and for thereby assisting in controlling the issue of glass through said outlet, and mechanically operated shears arranged to meet between the cup and the outlet to sever the glass in timed relation with the movement of the cup.

64. Apparatus for feeding molten glass, comprising a container for the glass having a downwardly opening discharge outlet, means within said container for controlling the issue of glass through said outlet, stationary heating means adjacent to and surrounding said outlet for preventing the accumulation of chilled glass at said outlet, a mold charge transfer cup adapted to cap the outlet to receive a charge of glass therefrom, means for oscillating the cup laterally toward and from said outlet, means for causing said cup to assist in controlling the issue of glass through said outlet, and mechanically operated shears arranged to meet between the cup and the outlet to sever the glass in timed relation with the movement of the cup.

65. Apparatus for feeding molten glass, comprising a container for the glass having a downwardly opening discharge outlet, a stationary annular heater adjacent to and surrounding said outlet, a cup movable vertically to and from position to cap said outlet and oscillated laterally to and from position below said outlet, means for causing said cup to assist in controlling the issue of glass through said outlet, and mechanically operated shears arranged to meet between the cup and the outlet to sever the glass in timed relation with the movement of the cup.

66. Apparatus for feeding molten glass, comprising a container for the glass having a downwardly opening discharge outlet, a cup movable to and from position below said outlet, means for causing said cup to assist in controlling the issue of glass through said outlet, a hollow annular heater surrounding said outlet, and completely closed at the discharge end of the outlet, and means for severing mold charges from the glass below said outlet.

67. Apparatus for feeding molten glass, comprising a container for the glass having a downwardly opening discharge outlet, a heater adjacent to the outlet, a glass supporting cup oscillated laterally to and from a position below said outlet and movable vertically below the outlet to and from position to cap the outlet, and mechanically operated shears arranged to meet between the cup and the outlet to sever the glass in timed relation with the movement of the cup.

In testimony whereof, I affix my signature.

ENOCH T. FERNGREN.

CERTIFICATE OF CORRECTION.

Patent No. 1,677,436.                                                     Granted July 17, 1928, to

ENOCH T. FERNGREN.

It is hereby certified that error appears in the printed specification of the above numbered patent requiring correction as follows: Page 3, line 67, strike out the small letter "m" and insert a capital "M"; line 99, after "206" insert "(Figs. 1 and 5)"; line 102, before the word "arm" insert the article "the"; line 110, after "208" insert "(Fig. 5)"; line 114, after "210" insert "(Fig. 6)"; line 122, after the word "plate" insert "(Fig. 10)"; page 4, line 1, for the word "reverse" read "invert"; line 5, strike out "see Figure 13" and insert instead "(Figs. 11, 12 and 13)"; line 13, after the word "rotating" insert the article "the"; line 15, after the word "reciprocated" insert the words "to invert the cup"; line 19, after "240" insert "(Figs. 2 and 3)"; line 20, after the word "and" insert the word "is"; line 24, for the word "Intermediate" read "Between"; line 25, strike out "160" and insert the numeral and word "166 there"; line 26, after "248" strike out the comma, and insert parentheses around the words "the same being"; line 30, for the word "lever" read "arm"; line 46, after "of" insert the article "the"; line 58, after "in" insert "the"; line 63, for "force action" read "forces acting"; line 64, for the word "causes" read "cause"; line 74, for "tension" read "tensioned"; line 76, strike out the word "respective"; line 89, after the word "apparatus" insert the words "and method"; and that said Letters Patent should be read with these corrections therein that the same may conform to the record of the case in the Patent Office.

Signed and sealed this 11th day of September, A. D. 1928.

(Seal)                                                                     M. J. Moore,
                                                                                Acting Commissioner of Patents.

DISCLAIMER 1,677,436.—*Enoch T. Ferngren*, Beaver, Pa. GLASS FEEDING AND DELIVERING MECHANISM AND PROCESS. Patent dated July 17, 1928. Disclaimer filed January 26, 1935, by the assignee, *Hartford-Empire Company*.

Hereby disclaims said claim 22 for the purpose of complying with what is understood to be required by law and to safeguard said owner's rights under the claims of said patent not hereby disclaimed; all without in any way modifying the scope, or affecting the validity, of the claims remaining in said patent.

"22. In apparatus for separating molten glass into mold charges, the combination of a receptacle for the glass having a submerged outlet, a member within the receptacle having a chamber opening toward the outlet, and having its lower edge submerged in the glass, and automatic means operating in a predetermined order and time, for periodically creating a vacuum within the chamber to prevent the discharge of glass from the outlet, and for supplying compressed air to the chamber to discharge the glass from the outlet."

[*Official Gazette February 26, 1935.*]